United States Patent [19]

Awane et al.

[11] Patent Number: 4,627,056

[45] Date of Patent: Dec. 2, 1986

[54] CHECK SYSTEM FOR A CONTROL BOARD

[75] Inventors: Misao Awane, Kitaadachi; Yorishige Suda, Kumagaya; Seiji Hara; Satoshi Kobayashi, both of Kitaadachi, all of Japan

[73] Assignees: Sanyo Electric Co., Ltd.; Tokyo Sanyo Electric Co., Ltd., both of Japan

[21] Appl. No.: 659,710

[22] Filed: Oct. 11, 1984

[30] Foreign Application Priority Data

Oct. 17, 1983 [JP] Japan .................................. 58-194853

[51] Int. Cl.[4] ............................................ G06F 11/00
[52] U.S. Cl. ...................................... 371/16; 364/579; 371/20
[58] Field of Search ...................... 371/16, 20; 364/200, 364/900, 479, 579, 580

[56] References Cited

U.S. PATENT DOCUMENTS

| 4,127,768 | 11/1978 | Negi et al. | 371/16 |
| 4,410,984 | 10/1983 | Negi et al. | 371/16 |
| 4,517,154 | 5/1985 | Dennis et al. | 364/579 X |
| 4,549,296 | 10/1985 | Castel et al. | 371/16 |

Primary Examiner—Charles E. Atkinson
Attorney, Agent, or Firm—Darby & Darby

[57] ABSTRACT

A check system for a control board having a microcomputer includes a checker which is actuated by a check program provided with the microcomputer. At each time line shift signals are generated, all input signal levels of the respective input connectors of the control board, except for the given connector, are detected to output at check output connectors signal levels corresponding to the input signal levels in the input line check. The respective output connectors of the control board, except for the certain connector, are rendered in active states, in sequence, in an output line check. The system thus detects an abnormal state disposed between the terminals of the microcomputer and the connectors of the control board.

7 Claims, 6 Drawing Figures

| ADDRESS | PORT DATA | ADDRESS | DATA |
|---------|-----------|---------|------|
| 0 0 A 0 | 0 2 | 0 0 C 0 | 0 E |
| 0 0 A 1 | 0 2 | 0 0 C 1 | 0 D |
| 0 0 A 2 | 0 2 | 0 0 C 2 | 0 B |
| 0 0 A 3 | 0 2 | 0 0 C 3 | 0 7 |
| 0 0 A 4 | 0 2 | 0 0 C 4 | 1 F |
| 0 0 A 5 | 0 2 | 0 0 C 5 | 2 F |
| 0 0 A 6 | 0 2 | 0 0 C 6 | 4 F |
| 0 0 A 7 | 0 0 | 0 0 C 7 | F B |
| 0 0 A 8 | 0 0 | 0 0 C 8 | F 7 |
| 0 0 B 0 | 0 1 | 0 0 D 0 | 0 1 |
| 0 0 B 1 | 0 1 | 0 0 D 1 | 0 2 |
| 0 0 B 2 | 0 1 | 0 0 D 2 | 0 4 |
| 0 0 B 3 | 0 1 | 0 0 D 3 | 0 8 |
| 0 0 B 4 | 0 1 | 0 0 D 4 | 1 0 |

OUTPUT DATA (rows 00C0–00C8)

MASK DATA (rows 00D0–00D4)

CHECK SYSTEM FOR A CONTROL BOARD

BACKGROUND OF THE INVENTION

1. Field of the Invention

The present invention relates to a check system for a control board provided with a micro-computer and, more particularly, to a check system for checking the abnormal state of wirings and interfaces disposed between the respective input/output connectors of the control board and the corresponding input/output terminals of the micro-computer.

2. Description of the Prior Art

There have been proposed many check systems for checking the abnormal state of the control board provided with the micro-computer by the employment of a checker to be connected between the control board and micro-computer before the operation thereof.

Check systems are largely divided into two types; one of which is for confirming whether or not certain signal levels of inputs/outputs exist by checking a given sequence with respect to the normal functions of the control board being actuated in the actual operation, and the other by the employment of a check program provided for operating the checker of simple construction within the main program for operating the micro-computer provided on the control board, both of which are difficult to present in a checker of standard construction capable of being applied to the various kinds of control boards.

For instance, U.S. Pat. No. 4,200,224 discloses a method and a system for isolating faults in a microprocessor and a machine controlled by the microprocessor, wherein the operation of the machine to be controlled by the microprocessor and the parts of the microprocessor are checked by the employment of a test program stored in the microprocessor. This system is characterized in that it tests a unit of the machine and microcomputer, both being connected with each other, and applies the test in broad areas including the machine. Therefore, this system has a disadvantage in the application of checking lines disposed between the connectors of the control board and the terminals of the microprocessor after removing the control board provided with the microprocessor from the machine. Also, for checking all the ports of the microprocessor to be connected with the checker, it is necessary to provide connectors or pins corresponding in number to all the ports therefore which increases the size of the control board. In addition, it is necessary to provide switches and light emitting diodes within the checker, whereby the standardization for the arrangement of the checker is difficult in practical use.

SUMMARY OF THE INVENTION

The present invention has been developed with a view to substantially solving the above described drawback and has for its essential object to provide an improved check system for a control board provided with a microcomputer wherein the arrangement of a checker can easily be standardized for use with various control boards.

It is also another object of the present invention to provide an improved check system of the above described type which is simple in construction and easy in operation.

In accomplishing these and other objects, according to one object of the present invention, a check system for a control board provided with a microcomputer, comprises in combination with the control board having a plurality of respective input/output connectors to be connected with the counterparts of input/output terminals of the microcomputer through the corresponding interfaces and providing an input connector which is not used in the actual operation and is connected with an input terminal of the micro-computer, the control board being arranged in the check operation such that the input connector is connected with a check mode appoint switch, the other two input connectors to be selected optionally are respectively connected with a line shift switch and an input/output changing switch and another output connector to be selected optionally is connected to a check output connector, the microcomputer being provided in addition to an actual operation program with a check program such that, when it is appointed to do an input line check by the actuation of the input/output changing switch, the input level of the respective input connectors, except for the input connectors of the control board, are detected at each time of operation of the line shift switch to output a signal level corresponding to the input level to the check output connector, and when it is appointed to do an output line check by the actuation of the input-/output changing switch, the output connectors, except for the output connectors of the control board, are made in an active state, in sequence, at each time of operation of said line shift switch, whereby, when the microcomputer is adapted to operate the check program by the actuation of the check mode appoint switch, in the input line check an abnormal state to be disposed between the input terminals and the input connectors can be detected by checking the signal level of the check output connector upon applying either a high level signal or a low level signal to the input connector corresponding to the input line selected by the line shift switch, while, in the output line check, an abnormal state to be disposed between the output terminals and the output connectors can be detected by checking the signal level of the output connector corresponding to the output line selected by the line shift switch.

BRIEF DESCRIPTION OF THE DRAWINGS

These and other objects and features of the present invention will become apparent from the following description taken in conjunction with a preferred embodiment thereof with reference to the accompanying drawings, throughout which like parts are designated by like reference numerals, and in which.

DESCRIPTION OF THE PREFERRED EMBODIMENT

The present invention will be described hereinafter in connection with an automatic vending machine including a microcomputer and a control board to be connected with a checker employed in a check system for the control board.

Figure 1:
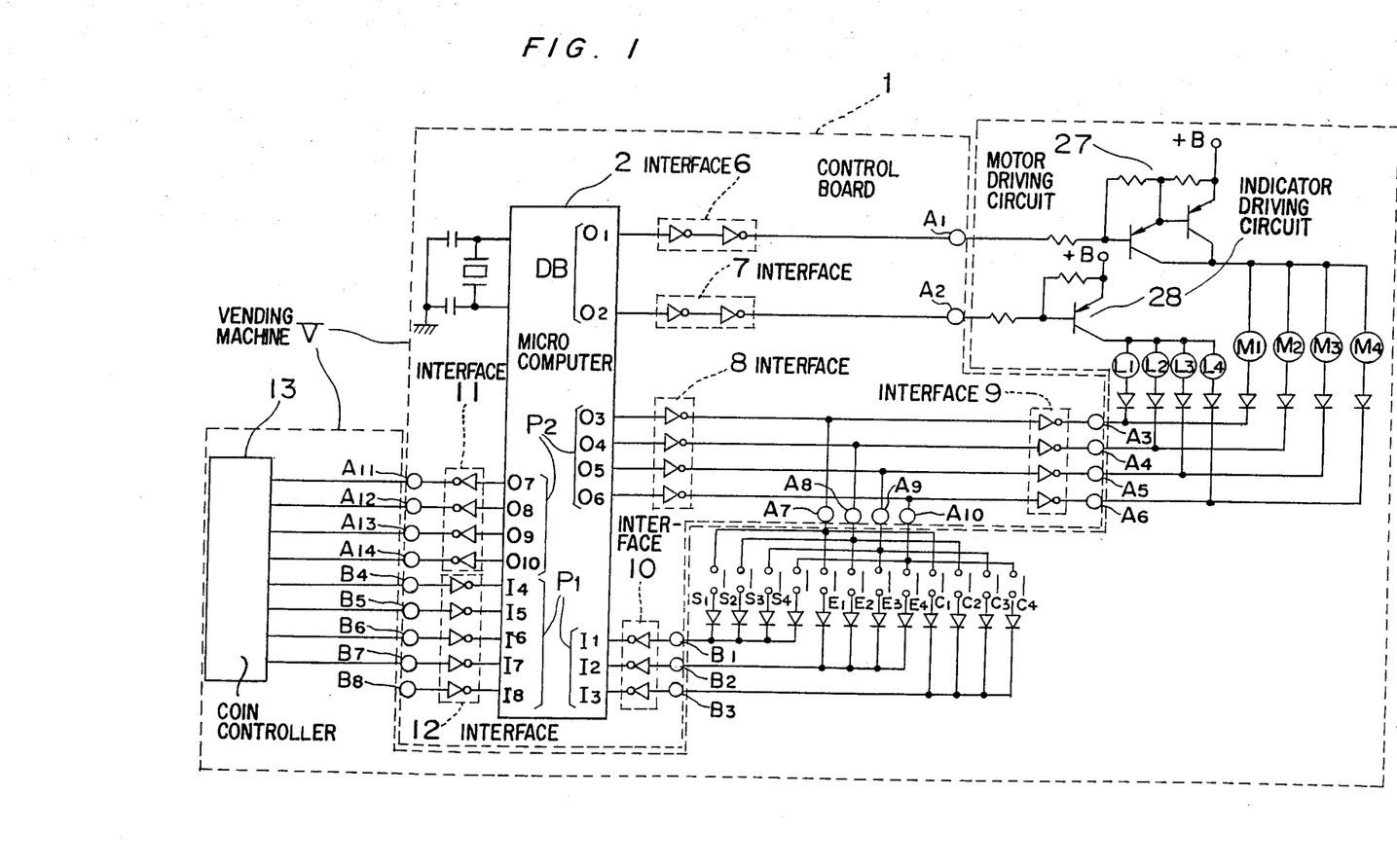
FIG. 1 is a circuit diagram showing one example of an automatic vending machine including a microcomputer assembled in a control board which can be applied into the check system of the present invention.

Referring to FIG. 1, there is shown a diagrammatic view of a block circuit to be employed within an automatic vending machine V including a microcomputer 2 assembled in a control board 1 which can be applied in the check system of the present invention. The control board 1 is designed to control the sales operation of the vending machine for selling, for instance, four kinds of goods to customers. In FIG. 1, there is provided an arrangement of control circuitry composed of the control board 1, including microcomputer 2, a plurality of interfaces 6, 7, 8, 9, 10, 11, four sets of drive motors M1, M2, M3, M4 for carrying goods for sale, sell-out indicators L1, L2, L3, L4, goods-selecting switches S1, S2, S3, S4, sell-out switches E1, E2, E3, E4, motor-carrier switches C1, C2, C3, C4, and a coin controller 13. The motors M and indicators L are associated with a motor driving circuit 27 and an indicator driving circuit 28, respectively. In this embodiment, the input terminals I1, I2, I3, I4, I5, I6, I7, I8 of the microcomputer 2 are adapted to correspond to each bit of the input port P1 having eight bits, respectively, the output terminals O1 and O2 correspond to the third and fourth bits of the data bus "DB" having eight bits, and the output terminals O3, O4, O5, O6, O7, O8, O9, O10 correspond to each bit of the output port P2 having eight bits. The motor driving circuit 27 is connected to a motor common connector A1 of the control board 1 in which the motor common connector A1 is connected to an output terminal O1 of the microcomputer 2 through an interface 6, while the indicator driving circuit 28 is connected to an indicator common connector A2 of the control board 1, in which the indicator common connector A2 is connected to an output terminal O2 of the microcomputer 2 through an interface 7. Four output terminals O3, O4, O5, O6 of the microcomputer 2, each corresponding to the respective goods to be sold, are connected not only to four output connectors A7, A8, A9, A10, each connected to the corresponding goods-selecting switch S1, S2, S3, S4, sell-out switch E1, E2, E3, E4, and motor-carrier switch C1, C2, C3, C4, for the individual goods to be sold through an interface 8, but also to four output connectors A3, A4, A5, A6 each connected to the corresponding drive motor M1, M2, M3, M4 and sell-out indicator L1, L2, L3, L4, through an interface 9. Also, three input connectors B1, B2, B3 of the control board 1 are respectively connected to the goods-selecting switches S1, S2, S3, S4, sell-out switches E1, E2, E3, E4 and motor-carrier switches C1, C2, C3, C4 and, in turn, are connected to the corresponding input terminals I1, I2, I3 of the microcomputer 2 through an interface 10. On the other hand, in the microcomputer 2, four output terminals O7, O8, O9, O10, each provided for outputting the corresponding selected-goods signal, are connected through an interface 11 to output connectors A11, A12, A12, A14 of the control board 1, which are in turn connected to the coin controller 13. Also, four other input terminals I4, I5, I6, I7, each provided for outputting the corresponding sales opening signal for the respective goods are connected through an interface 12 to input connectors B4, B5, B6, B7 of the control board 1, which are in turn connected to the coin controller 13. The coin controller 13 is designed to be operated such that, upon calculating the invest money of the customer, judgement is made as to which goods can be sold for the amount of money invested to output the sales opening signals relating to the goods capable of being sold, and the balance between the invested money and the price of the sold goods is calculated upon receipt of the selected-goods signal to be generated from the control board with respect to the goods selected by the customer.

With the above arrangement of the vending machine, the operation of the control board 1 will be briefly described hereinafter. In the stand-by state, i.e., when the vending machine is not being used, the microcomputer 2 always operates to detect the sales goods capable of being sold, which is decided by the coin controller 13 in response to the signal level of the respective input terminals I4, I5, I6, I7 and to detect the sell-out goods which are unable to be sold in response to the signal level of the corresponding input terminal I2 upon rendering the output terminals O3, O4, O5, O6 at the low signal level L in sequence. Also, the microcomputer 2 is adapted to render not only the output terminal O2 at L according to detecting the sell-out goods, but also the output terminals O3, O4, O5, O6 corresponding to the sell-out goods being unable to be sold at L, and to turn on the sell-out indicator L1, L2, L3, L4 corresponding to the sold out goods.

After the vending machine has received the customer's selection, if and when the microcomputer 2 is rendered to detect any one of the sales goods which are able to be sold, the microcomputer 2 is then operated to detect which one of the goods-selecting switches S1, S2, S3, S4 has been operated by the customer. This operation is performed by the detection of the signal level in the input terminal I1 upon rendering the output terminals O3, O4, O5, O6 at the low signal level "L" in sequence. Upon the detection of the operation for the selection of any one of the goods-selecting switches S1, S2, S3, S4, the microcomputer 2 is operated to determine whether or not the selected goods is one of the sales goods decided by the coin controller 13. And, when the selected goods is capable of being sold from the vending machine, the output terminal O1 and one of the output terminals O3, O4, O5, O6 corresponding to the selected goods are respectively turned to "L", and one of the motors M1, M2, M3, M4 for carrying the goods for sale corresponding to the selected goods is automatically driven. Then, one of the motor-carrier switches C1, C2, C3, C4 corresponding to the one of the driving motors M1, M2, M3, M4 is turned ON by the actuation of the motor M and is turned OFF after the motor M is driven for a time sufficient enough to carry out the goods for sale. After driving the motor M corresponding to the selected goods, the microcomputer 2 is always rendered to detect the signal level of the input terminal I3, which is turned to "L" by the ON state of the motor-carrier switches C1, C2, C3, C4 and to "H" by the OFF state. When the microcomputer 2 detects the changing of the signal level of the input terminal I3 from "L" to "H", which is adapted to indicate the completion of the sale of the goods, the output terminal O1 and one of the output terminals O3, O4, O5, O6 corresponding to the sold goods are respectively turned to "H" to return back to the original stand-by state of the vending machine.

With the above construction, the control board 1 adapted to make a check operation on the application of a given check signal often renders itself to check whether or not the wirings and interfaces are normal in order to ensure the correct operation of the vending machine.

Among the methods for checking the control board 1, the simplest way is by the employment of a tester which is adapted to check the respective terminals thereof upon rendering the control board in the actual operation state. However, when the control board 1 is designed as one of multiplex type, as shown in FIG. 1, to control the microcomputer for the purpose of reducing the number of wirings to input/output terminals and terminal parts thereof, the control board 1 can no longer be checked by a conventional tester. Also, even if a synchroscope or a memoryscope is employed to observe waveforms of the signals at the terminals of the control board 1, such an observation for the waveforms is complex for an inexperienced person. Accordingly, in a case where checking many control boards completed at an assembly process in a factory is required in a given period of time, it is frequently adapted to practically use a checker having an arrangement for checking the control board under an actual operation state thereof. For the purpose of checking whether or not a certain signal is obtained at a given output terminal in accordance with a program of the microcomputer 2 provided on the control board 1 under the actual operation state of the control board 1 of which the input terminal is given a signal of a given level, a control circuit of the checker is usually required to process at a high speed greater than or equal to that of the microcomputer 2. For instance, in a case where a check is made as to whether the output connector A3 is at a low level at the time of the low level disposed at the indicator common connector A2 after rendering the sell-out switch E1 to ON by the operation of the control board 1, for detecting the condition of the sell-out switches E1, E2, E3, E4 and goods-selecting switches S1, S2, S3, S4 upon turning ON of the sell-out indicator L1 by the multiplex operation of the microcomputer 2, the time necessary for the turning-on process is rendered comparatively short, whereby, if the process speed of the control circuit in the checker is relatively low, after detecting the low level signal at the indicator common connector A2 the detection for the signal level of the output connector A3 is sometimes tried in vain because of the non-existence of signal thereat while outputting the low level signal from the control board 1 in advance. Accordingly, in a checker for the detection, it is necessary to employ a control circuit of high speed process, which is manufactured at high cost. In addition, the design of the checker usually needs a large amount of power for both the software and hardware, more than that of the development of the control board, but also with difficulty of the standardization for the design the checker must be developed individually for each of the control boards. In another process, there is a method in which, by providing a check-program in the microcomputer, the checker is adapted to give a signal to an input connector of the control board 1 and the checking process of the checker is performed by whether or not a certain signal is obtained at a specific output connector of the control board 1 in accordance with the check-program of the microcomputer 2. Such a check program is designed totally different than the actual operation of the control board 1, for instance, in such a manner that all the input/output connectors are designed to perform input/output operations so as to output the signal of "H" at the output connector A1 in case the signals of "H" are inputted at both of the input connectors B1 and B2 of the control board 1, respectively. This checking method can render the process speed of the microcomputer 2 low by providing an idle-timer provided in the check-program. Accordingly, since the control circuit of the checker can be designed at a low speed due to the ability to perform the input/output operation at a low speed for the control board 1, there is an advantage in that it is possible to design the checker with a simple and economical construction. However, in this checking method, it is necessary to develop the check-program for the checker independent of the actual program of the microcomputer 2, and, also, it cannot provide by any means a standardization for the check-program according to the respective control board 1, and for manufacturing the checker suitable for the respective check-program.

For eliminating the above disadvantages of the checking method, the present invention is to provide a check system which can easily provide a standardization of a checker and a check-program common to the control boards of various types.

The check system of the present invention is provided with a control board wherein each of the input/output terminals of a microcomputer arranged thereon is connected with the counterpart of the input/output connectors thereof through the respective interface, said control board is provided with a first connector to input a check signal for instructing the starting of the check operation, a second connector to input an input/output appoint signal for changing the checking operations between the input lines and the output lines of the control board, a third connector to input a line shift signal for selecting in sequence the input lines or the output lines to be checked, and a fourth connector to input a check output signal for outputting the level state of the input connector selected by the line shift signal. The microcomputer is provided with a check-program such that, if the input line check is appointed, all input signal levels of the respective input connector of the control board, except for the first through third connectors, are detected each time of the line shift signals are generated to output signal levels corresponding to the input levels to the check output connectors, and if the output line check is appointed, the respective output connectors of the control board, except for the fourth connector, are rendered in active states in sequence each time the line shift signals are generated, whereby in the input line check, an abnormal state between each input terminal and the counterpart input connector of the control board can be discriminated by the signal levels of the check output connector upon applying a signal of high or low level at the input line selected by the line shift signal, while in the output line check an abnormal state between each output terminal and the counterpart output connector of the control board can be discriminated by the signal levels of the output lines selected by the line shift signal.

Figure 2:
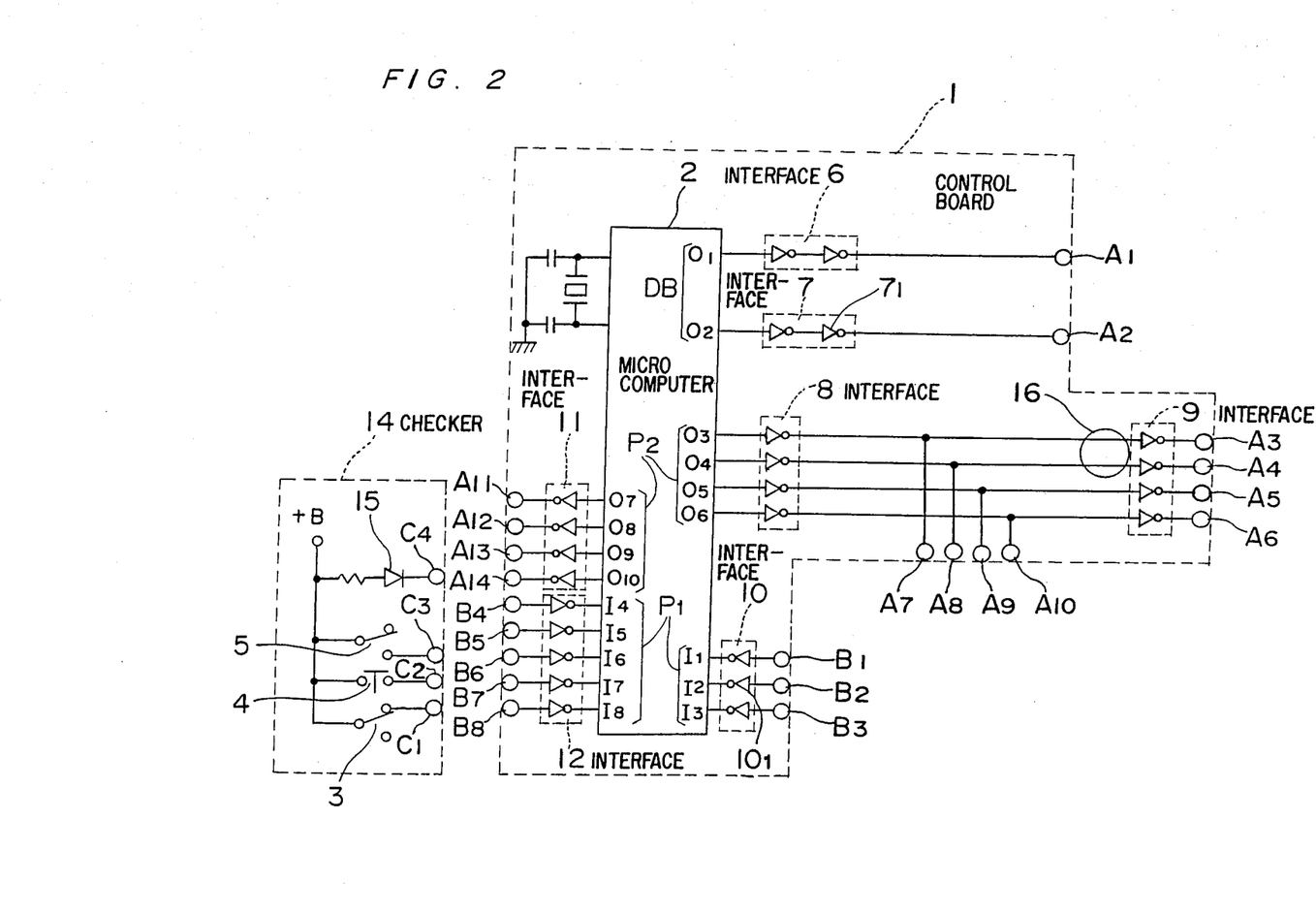
FIG. 2 is a circuit diagram showing one preferred embodiment including the control board of FIG. 1 and a checker which is applied to the check system of the present invention.

By way of example, a circuit diagram, including the control board of FIG. 1 and a checker to be employed within the preferred embodiment of the check system of the present invention, is shown in FIG. 2. In FIG. 2, the control board, including the microcomputer 2 to be assembled into an automatic vending machine, is totally identical to that in FIG. 1 and is associated with a checker 14, including a power supply of +B, a first switch 3 for appointing the check mode for the control board 1, a second switch 4 for the line shift, and a third switch 5 for changing the input and output. In addition, it is necessary to provide an output connector B8 on the control board 1 to be checked, which is not used in blank in the actual operation within the vending machine as shown in FIG. 1, but, in the check operation, is connected with the first switch 3 through a terminal C1 of the checker 14 as shown in FIG. 2. In the check operation of this embodiment, the output connector A14 of the control board 1 is adapted as a connector for a check output and a light emitting diode 15 (hereinafter referred to as LED) is employed in a process for detecting a signal level at the check output connector A14 of the control board 1. Accordingly, the checker 14 of this embodiment is provided with the LED 15 in addition to the switches 3, 4, 5, the LED 15 being connected to the output connector A14 of the control board 1, which is adapted as a check output connector in the check operation, through the terminal C4 of the checker 14. Also, the second and third switches 4 and 5 are respectively connected with optional input connectors, i.e., the input connectors B6 and B7 in FIG. 2, through the corresponding terminals C2 and C3.

Figure 3:
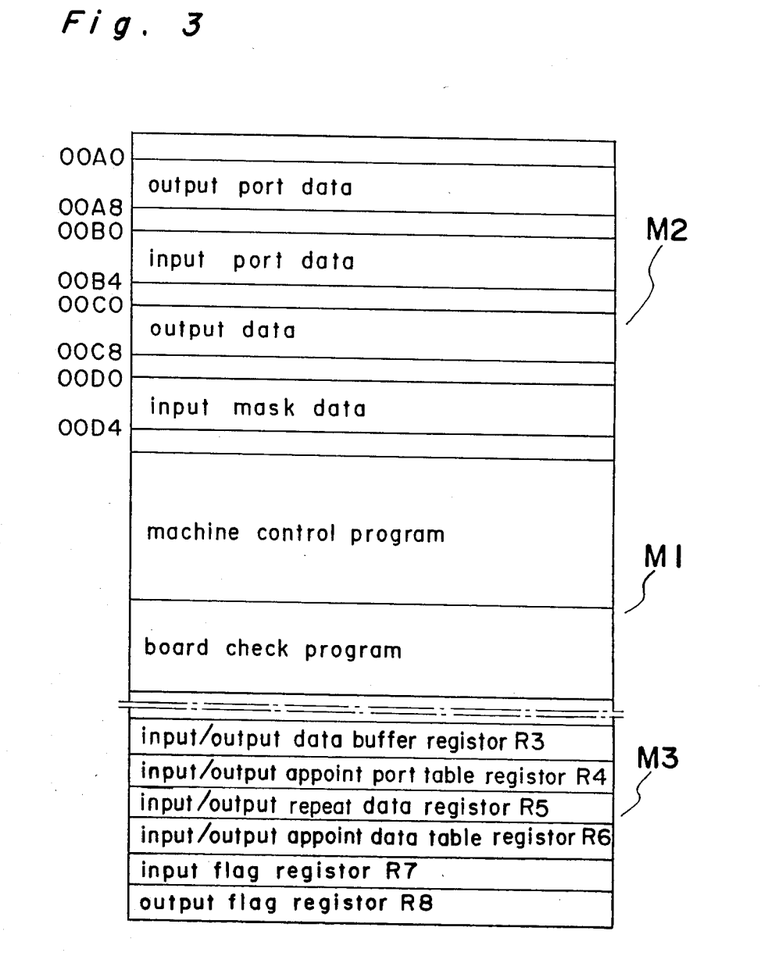
FIG. 3 is a diagram showing a format of memory to be included within the microcomputer of FIG. 1.

On the other hand, a format of memory to be included within the microcomputer 2 is schematically shown in FIG. 3. In the format of FIG. 3, a program is stored in an area of M1, and is divided into two parts, a machine control program and a board check program, the former controlling the actual operation of the vending machine in series, and the latter checking the control board of the present invention. In an area of M2 for storing data of the program, the output port data is stored at addresses from 00A0 to 00A8, the input port data at addresses from 00B0 to 00B4, the output data for the output terminal at addresses from 00C0 to 00C8, and the input mask data at addresses from 00D0 to 00D4, respectively. An area of M3 is adapted to form a RAM including an input/output data buffer register R3, an input/output appoint port table register R4, an input/output repeat data register R5, an input/output appoint data table register R6, an input flag register R7 and an output flag register R8.

Figure 4A:
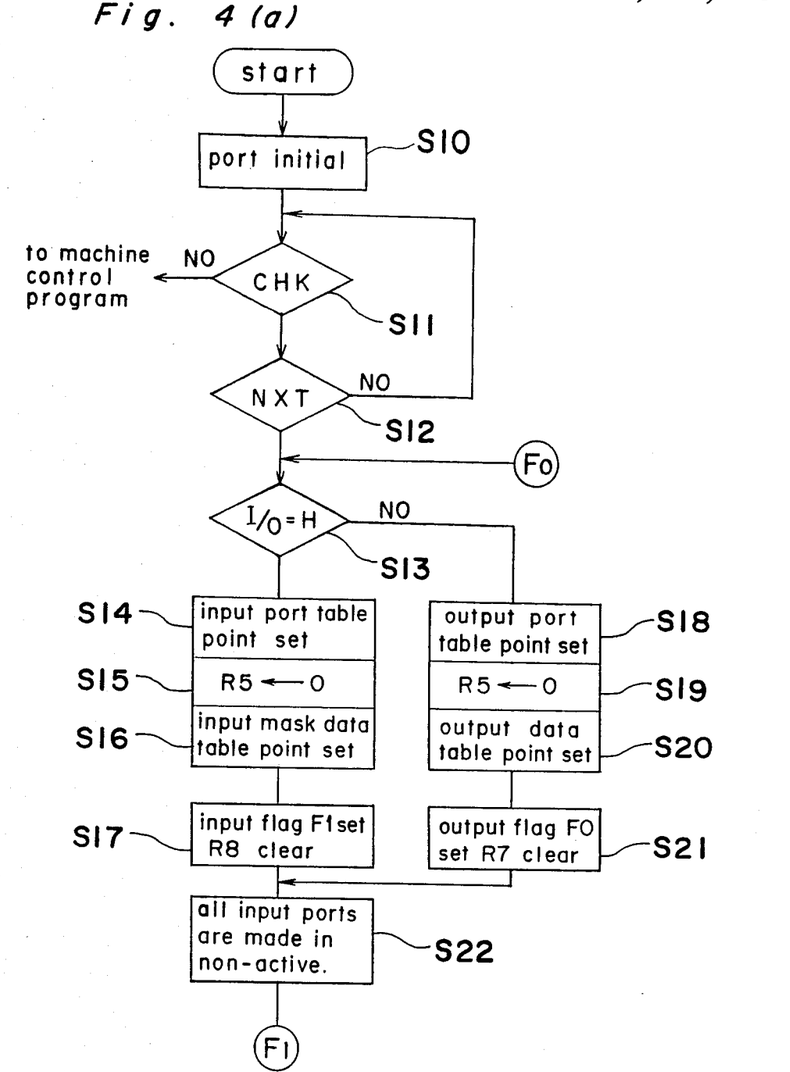
FIGS. 4(a) and 4(b) are a flow-chart showing a program which is applied to the check system of the present invention.
Figure 4B:
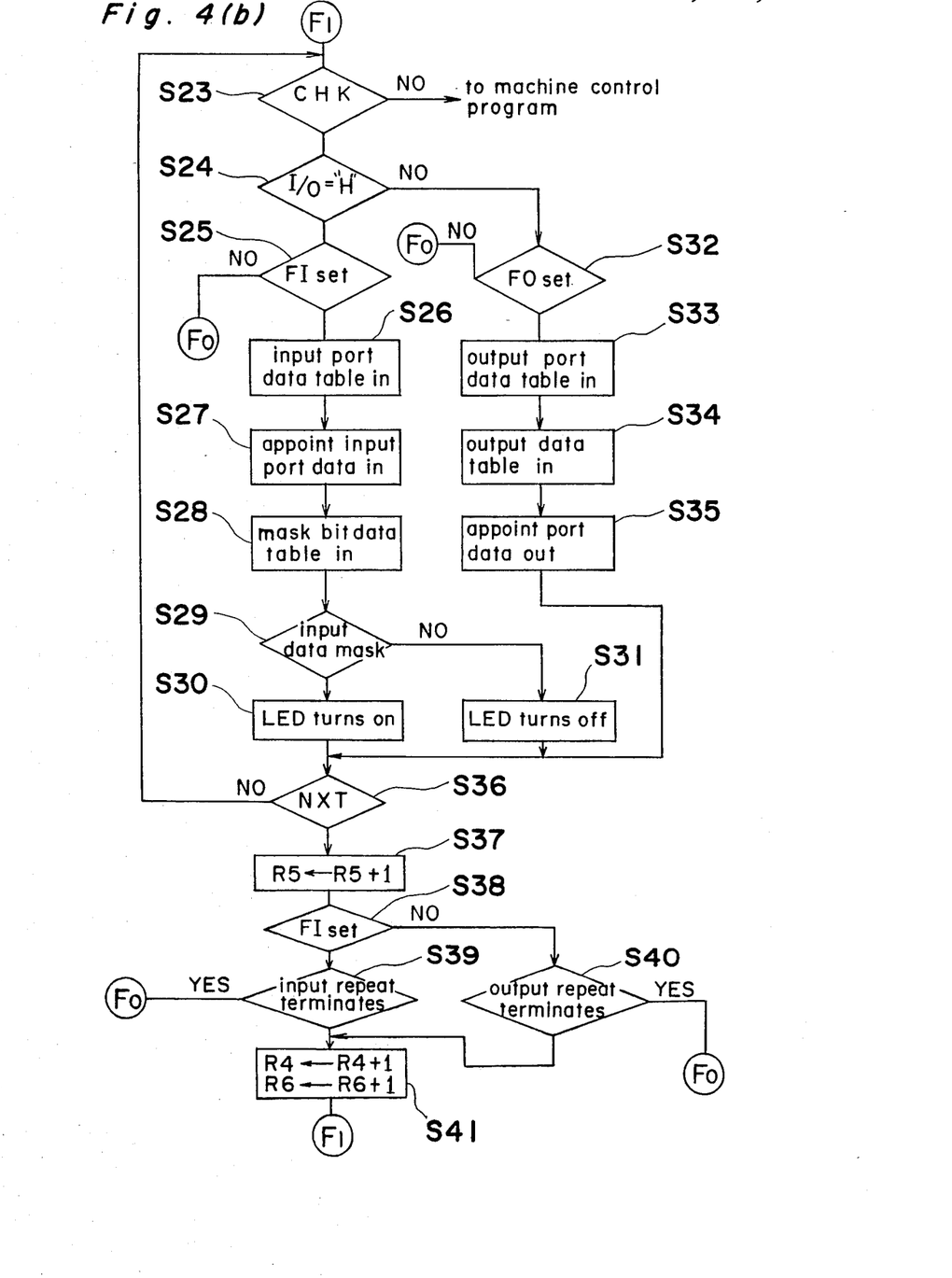

Referring to a flow chart as shown in FIG. 4, the operation or working of the program in the embodiment of the present invention will be described hereinafter. The checking for the control board is initially proceeded by changing the check mode appoint switch 3 to close a power source and, then, by turning on the line shift switch 4. At this time that the electric power of +B is loaded on the connector B8 of the control board 1 upon the actuation of the check mode appoint switch 3, a check signal CHK of "L" level is introduced into the input terminal I8 of the input port P1 in the microcomputer 2. Accordingly, the board check program is actuated by the detection of the line shift signal NXT being introduced to the input terminal I7 upon the ON operation of the line shift switch 4 at step S12 after the initiative of each port is firstly made at step S10 in succession of loading electric power to the circuitry, and the input of the check signal CHK is detected at step S11. However, in case that the check signal CHK is not introduced at the step S11, the machine control program is, in turn, actuated.

In accordance with the flow of the board check program actuated, at first the operation for selecting one from the input line check and output line check is made in a manner that the input terminal I6 of the input port P1 is adapted to the output line check in the state of "L" level or the input line check in the state of "H" level. Therefore, at the step S13, if the input/output change signal I/O to be inputted to the input terminal I6 is detected at "H" level, the step is proceeded to the next process of step S14. At the step S14, the initial of the input port table point is appointed by setting the data "B0" programmed in the memory to the input/output appoint port table register R4. At step S15, the input/output repeat register R5 is set to a signal of "0". At the next step S16, the initial of the input mask data is appointed by setting the data "D0" programmed in the memory to the input/output appoint data table register R6. At step S17, the input line check mode is appointed by making the register R8 clear and by setting the input flag F1 to the register R7. Also, at the following step S22, all the input/output ports are rendered to a state of non-active. That is, all of the input ports are rendered to set at the signal level of "H" or "L" according to the condition of the input port.

At step S23, the presence of the check signal CHK is judged, but, in case of non-existence of the check signal CHK, the operation for checking is rendered to finish and the machine control program for controlling the actual operation of the vending machine is actuated. In case of the existence of the check signal CHK, at step S24 the level of the input/output change signal I/O is confirmed, and if the same level of "H" is maintained, at step S25 the register R7 is confirmed to set the input flag therein. At step S26, the address "00B0" of the memory is appointed on the base of the data "B0" loaded on the register R4, and is read out the input port data programmed in the address.

Figure 5:
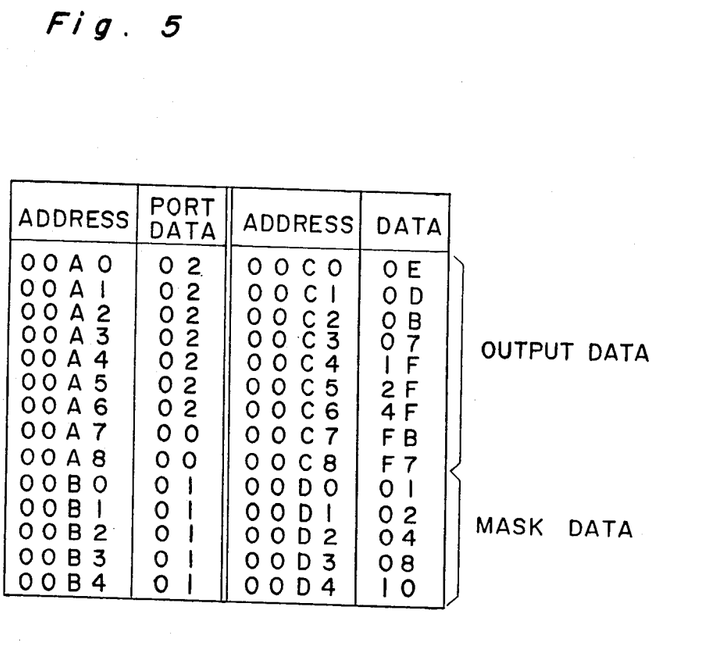
FIG. 5 is a table map to be programmed within the memory of the microcomputer for performing functions of the flow-chart of FIG. 4.

As clearly shown in FIG. 5, the address "00B0" is programmed with the signal "01" as an input port data, which means an input from the input port P1. Therefore, at step S27, the input port P1 is rendered to input the data and the input/output data buffer register R3 is loaded with this input data. At step S28, the address "00D0" of the memory is appointed on the base of the data "D0" loaded on the register R6, and is read out the input mask data programmed in the address. With the input mask data of the address "00D0" being the signal "01", at step S29, the register R3 is adapted to calculate the logical operation of AND between the loaded data and the input mask data, and if the calculation resultant is "0", at step S30 the output terminal O10 of the output port P2 becomes the level "H" to turn on the LED 15. However, if the calculation resultant of AND is the one except for "0", at step S31 the output terminal O10 of the output port P2 is rendered to "1". Such an operation of the above calculation judgement is adapted to do the input line check corresponding to the input terminal I1 of the first bit of the input port P1. Namely, the input mask data "01" of hexacode is presented by "00000001" on BC code, and if the check operator operates to load the electric power, for instance, of +5 V to the connector B1 of the control board 1, in case of the input line being normal the input terminal I1 becomes "L" and the input data of the port P1 becomes "01111110". In addition, at this time the "0" of the eighth bit is the check signal CHK, and the "1" of the sixth bit shows the level "H" of the input/output change signal I/O. Accordingly, the AND between the input mask data "00000001" and the input data "01111110" is "00000000", and at step S30 the LED 15 is turned on. However, in case of the input line being abnormal, for instance, if the IC(10₁) of the interface 10 is abnormal, the input terminal I1 becomes "H" to make the input data of the port P1 to "01111111", and the AND between the input data and the input mask data becomes "00000001". Accordingly, since the calculation resultant of the AND is one except of "0", at step S31 the output terminal O10 becomes "L" to turn off the LED 15, with indicating the abnormal state of the input line between the input terminal I1 and the connector B1. Also, the check operation can be made in more correct manner by making the input terminal I1 to the level "H" upon the earth of the connector B1 after the input terminal I1 is made to the level "L" on loading of the electric power of +5 V. In this case, the input data of the port P1 is "01111111" and the AND between the input data and the mask data of "00000001" becomes "00000001" to turn off the LED 15. Accordingly, the turn-on of the LED 15 can be confirmed by loading the electric power of +5 V onto the connector B1, and, then, the turn-off of the LED 15 can be confirmed by putting the connector B1 onto the earth.

At step S36, the line shift signal NXT is confirmed, and it is judged to do whether or not it moves to the next input line check. When the line shift switch 4 is actuated by the check operator to detect the line shift signal NXT at step S36, the process is proceeded to step S37 to increment the data of the input/output repeat data register R5. The step S38 is adapted to judge whether or not the input flag F1 is set to the register R7, but, in this case of the operation being in the input line check mode, the process is made at step S39, wherein the judgement is made about whether or not the input repeat loaded to the register R5 becomes "5". If the input repeat is less than "5", at step S41 the contents of the registers R4 and R6 are respectively adapted to increment to get "B1" and "D1" and, then, the process is proceeded to step S23. Also, when the check mode signal CHK is detected at step S23, the input/output change signal I/O is detected with the level "H" at step S24, and the set of the input flag F1 is detected at step S25, at step S26 the address "00B1" of the memory is appointed on the base of the data "B1" of the register R4 to read out the input port data "0". In this embodiment wherein all the input terminals I1 to I5 of the microcomputer 2 for applying to the input line check are adapted to set to the same input port P1, the addresses "00B0" to "00B4" of the memory are respectively programmed with the same data of "01". Accordingly, at step S27 the data is again inputted from the input port P1 to load to the register R3. At step S28 the address "00D1" of the memory is appointed on the bases of the data "D1" of the register R6 to read out the input mask data. The input mask data of the address "00D1" is "02", and at step S29 the AND between the input data loaded to the register R3 and the input mask data "02" is calculated to make a judgement of whether the calculation resultant is "0" or not. In this case that the check operator operates to load the electric power of +5 V onto the connector B2 of the control board 1, if this input line is normal, the input terminal I2 becomes "L" to make the input data of the input port P1 to "01111101". Accordingly, the AND between the input mask data "00000010" and the input data becomes "0", and at step S30 the LED 15 is turned on. However, if this input line is abnormal to make the input data of the input port P1 to "01111111", the AND between the input mask data and the input data becomes "00000010" to process step S31, resulting in that the LED 15 is not turned on. Also, in the same manner, the input mask data "04", "08", "10" are respectively read out from the addresses "00D2", "00D3", "00D4", with being capable of the check for each input line, at every time incrementing the data of the register R6 to "D2", "D3", "D4" upon the pressing of the line shift switch 4. Then, when the input repeat of the register R5 reaches to "5" after finished the check of the input line at five times, the process is proceeded to step S13. With this manner, in the input line check mode, when the electric power of +5 V is loaded through crip wires on the certain connector of the input side in accordance with the operation repeat upon the actuation of the line shift switch 4 to be operated by the check operator, the microcomputer 2 is adapted to check whether or not the input line is normal, and if the input line is normal, the LED 15 is turned on.

On the other hand, when the output line check is selected by the input/output change switch 5, at step S13 the detection for the input/output change signal I/O being "L" is made to proceed to step S18. At step S18, the initial of the output port table point is appointed by setting the certain data "A0" into the register R4. At step S19, "0" is set into the register R5. At step S20, the initial of the output data is appointed by setting the given data "C0" into the register R6. At step S21, the output flag F0 is set into the register R8 and the output line check mode is appointed by making the register R7 clear, while, at step S22, all of the input/output ports are rendered to non-active.

Also, when the check signal CHK is detected at step S23 and the input/output change signal I/O is detected as being "L" at step S24, the set of the output flag F0 is confirmed at step S32. In case of the output flag F0 being set, at step S33, the address "00A0" of the memory is appointed on the base of the data "A0" loading to the register R4, and the output port data being programmed into the address is read out. "02" is programmed as the output port data in the address "00A0", but this means an output from the output port P2. At step S34, the address "00C0" of the memory is appointed on the base of the data "C0" loaded to the register R6, and the output data "0E" being programmed into the address is read out. At step S35, the output data "0E" is set into the output port P2 providing with a plurality of output terminals O3 to O10, the output data "0E" being "00001110" of the BC cords, and the output terminal O3 becomes "L", while, at this time, if the output line between the output terminal O3 and the connector A3 of the output side of the control board 1 is normal, the output level of the connector terminal A3 becomes "L". Therefore, by measuring the voltage of the connector A3 with a tester the check of the output line can be made by the check operator. For example, if and when there is a portion 16 of the circuitry attached to the conductor on the control board 1 by the Voisker phenomenon and the like, "H" is outputted from the output level of the connector A3, since the output level of the output terminal O4 is "H", thereby to render to detect the abnormal of the output line. Also, in case of the output terminal O3 being "L", the check for the output line between the output terminal O3 and the connector A7 can also be made by measuring with the tester whether the output level of the connector A7 disposed at the output side of the control board 1 is "H" or not. In addition, at step S36, when the line shift signal NXT is detected by the actuation of the line shift switch 4, the register R5 is adapted to increment at step S37. Then, the step S38 is adapted to judge whether or not the input flag F1 is set to the register R7, in this case of the operation being in the output line check mode, the process is made at step S40, wherein the judgement is made about whether or not the output repeat loaded to the register R5 becomes "5". In this embodiment, the output terminals of the microcomputer 2 to be connected with the connector of the output side of the control board 1 are nine kinds of O1 to O9, and the maximum of output repeat is set at nine. In case of the output repeat being less than nine, at step S41 the contents of the registers R4 and R6 are respectively adapted to increment to get "A1" and "C1", and, then, the step is proceeded to step S23. Also, when the check mode signal CHK is detected at step S23, the input/output change signal I/O is detected with the level "L" at step S24, and the set of the output flag F0 is detected at step S32, at step S33 the address "00A1" of the memory is appointed on the base of the data "A1" loaded to the register R4 to read out the output port data "02" programmed in the address. At step S34, the address "00C1" of the memory is appointed on the base of the data "C1" loaded to the register R6 to read out the output data "0D", and at step S35 the output data "0D" is set at the output port P2. The output data "0D" is "00001101" of BC code, and, in this case, the output terminal O4 is "L", and, therefore, the check of the input line between the output terminal O4 and the connector A4 can be made by measuring with the tester whether the voltage level of the connector disposed at the output side of the control board 1 is "L" or not. In addition, the output line check can also be made by measuring with the tester whether the voltage level of the connector A8 is "H" or not. In the same manner with the above, when by pressing the line shift switch 4 the data of the registers R4 to R6 are adapted in sequence to increment to get "A6", "C6", respectively, the same port data "02" is read out from each address "00A2", "00A3", "00A4", "00A5", "00A6" of the memory to be appointed by the register R4, but the output data "0B", "07", "1F", "2F", "4F" are read out in order from each address "00C2", "00C3", "00C4", "00C5", "00C6" of the memory to be appointed by the register R6. Accordingly, the output terminals O5, O6, O7, O8, O9 of the output port P2 become "L" in order, thereby to render to make the output line check for couples between the output terminals and the corresponding connector A5(A9), A6(A10), A11, A13, A15.

If the line shift switch 4 is pressed in further succession, the data of the register R4 and R6 respectively become "A7" and "C7" to read out the port data "00" from the address "00A7" of the memory on the base of the data of the register R4, this port data meaning an output from the data bus "DB". Accordingly, the output port is changed after the output line check corresponding to the output terminal O9 is finished. However, with respect to the output port P2 the check for the output terminal O10 connected to the LED 15 for use in check is skipped off. Also, the output data "FB" is read out from the address "00C7" of the memory on the base of the data of the register R6. Since in this embodiment the third and fourth bits of the data bus "DB" having eight bits are used for the output terminals O1, O2, when the data bus "DB" is set with the output data "FB" being "11111011" by the BC code, the output terminal O1 becomes "L". Therefore, the output line check between the connector A1 and output terminal O1 can be made by measuring with the tester about whether the voltage level of the connector A1 of the control board 1 is "L" or not. And, when the line shift switch 4 is pressed again, the data of the registers R4 and R6 become "A8" and "C8", respectively, and the port data "00" and output data "F7" are respectively read out from the addresses "00A8" and "00C8" of the memory on the base of these data. Accordingly, when the output data "F7" is set on the data bus "DB", the fourth bit of the output terminal O2 becomes "L", and the output line check between the connector A2 and output terminal O2 can be made by measuring with the data about whether the voltage level of the connector A2 of the control board is "L" or not. For instance, when the IC($7_1$) of the interface 7 has something of abnormal, the voltage level of the connector A2 becomes "H", and, in this case, the abnormal state of the IC($7_1$) can be detected by examining with the tester a portion between the connector A2 and output terminal O2. In the same manner, the output terminal O3, O4, . . ., O9, O1, O2 are rendered to be "L" in sequence at every time of introducing the line shift signal NXT, and the register R5 is adapted to make the sum one by one at step S37, and, then, the process is proceeded to step S13 upon detecting that the output repeat to be loaded to the register R5 is reached to nine at step S40. And, when the check operator actuates to change the check mode appoint switch 3, at step S23 the check signal is not detected and the machine control program is actuated for controlling the actual operation of the vending machine.

With the above check program, according to the arrangement of the control board 1 to be checked, it is necessary to predetermine the output connectors and input connectors to be connected to the checker 14 during the checking thereof, the input connector number to be checked and the sequence for inputting the number from the corresponding input connectors, the output connector number to be checked and the sequence for changing the corresponding output connectors into the active state, and the active level of the respective output terminal according to the condition of the interface, and the check process itself is easily established in common with the others.

As was clearly mentioned within the above embodiment, the check system of the present invention establishes a check program for checking the control board into a microcomputer associated with the control board, and is provided on the control board with the check output connector and the respective input connectors each receiving a check signal for instructing the start of the check operation, an output/input appoint signal for changing between the check of input lines and the check of output lines, a line shift signal for selecting in sequence either the input lines or the output lines to be checked, respectively, whereby the common check system can be applied to all types of control boards. In this system, the input/output lines provided on the control board are checked in a static state, whereby the checking of the control board can perfectly be done in the manual operation of a tester or the like, and the inspection service therefor can easily be provided in the city market. Also, even when the checker is designed to check the input terminal lines and output terminal lines in an automatic operation, this system can effectively be applied to present a checker of a standard type which is easily applied to the others merely by the employment of the input interface corresponding to the input level of the input terminal of the control board and the output interface corresponding to the active level of the output terminal of the control board.

The checker 14 of the above embodiment is a device of simple construction provided with the check mode appoint switch 3, input/output changing switch 5 and line shift switch and LED 15. The check system of the present invention is modified so as to be more useful in the employment of a personal computer. In this modification, the personal computer is connected to the input interface corresponding to the active level of the output connector between the cable and control board and to the control board through the output interface corresponding to the input level of the input connector of the control board, and is adapted to judge the quality of the control by making the check of the input line and output line automatic as mentioned above in the employment of software in the personal computer. Also, the personal computer is adapted to input to the software, made by a conversation form on the display at the starting point of the check operation, such items of the check output connector of the control board and the input connector of the control board to be inputted to the check signal, input/output appoint signal and line shift signal, the input connector number to be checked and the sequence for inputting the number from the input connector of the control board, and the output connector number to be checked and the sequence for making these output connectors of the control board active, whereby the checker associated with the personal computer is commonly designed for all types of control boards, except for some of the interfaces.

Although the present invention has been described and illustrated in detail, it is to be clearly understood that the same is by way of illustration only and is not to be taken by way of limitation, the spirit and scope of the present invention being limited only by the terms of the appended claims.

What is claimed is:

1. A check system comprising a control board having a plurality of input/output connectors to be connected to an apparatus, and a microcomputer provided on the control board and having a plurality of input/output terminals each connected to the corresponding input/output connector of the control board through the respective interface and a control program for controlling the actual operation of the apparatus in series, said microcomputer including a line check program for checking an abnormal state to be disposed between the input/output terminals and input/output connectors, said line check program including a first function for appointing a check mode when a check signal is introduced into said input connector which is not used during the operation of the control program, a second function for appointing either an input line check or an output line check in said check mode, a third function in said check mode for selecting either said input connector in said input line check or said output connector in said output line check, a fourth function for detecting the signal level of said input terminal connected to said input connector which is selected in said input line check, a fifth function for outputting, in the check operation wherein one of the output connectors is employed as a test output connector, a signal corresponding to the level of said input terminal to be detected by the fourth function to said output terminal connected with said test output connector, and a sixth function for outputting a signal of a certain level from said output terminal connected with said output connector which is selected in the output line check.

2. The check system as defined in claim 1, wherein said second function of the line check program includes a seventh function for appointing either the input line check or output line check in response to an input/output changing signal to be introduced into the certain input connector.

3. The check system as defined in claim 1, wherein said third function of the line check program includes an eighth function for selecting, at each time of introduction of a shift signal to the given input connector, either said input connectors in sequence in the input line check or said output connectors in sequence in the output line check.

4. The check system as defined in claim 1, wherein said control board is designed to be able to connect a check mode appoint switch with the input connector to be introduced to said check signal.

5. The check system as defined in claim 2, wherein said control board is designed to be able to connect an input/output changing switch with the input connector to be introduced to said input/output changing signal.

6. The check system as claimed in claim 3, wherein said control board is designed to be able to connect a line shift switch to the input connector to be introduced to said shift signal.

7. The check system as claimed in claim 1, wherein said control board is designed to be able to connect a test indicator to said test output connector.

* * * * *